(12) United States Patent
Luo

(10) Patent No.: US 7,502,894 B2
(45) Date of Patent: Mar. 10, 2009

(54) SHARED ROWSET

(75) Inventor: Fei Luo, Bedmister, NJ (US)

(73) Assignee: BEA Systems, Inc., Redwood Shores, CA (US)

( * ) Notice: Subject to any disclaimer, the term of this patent is extended or adjusted under 35 U.S.C. 154(b) by 0 days.

(21) Appl. No.: 11/110,215

(22) Filed: Apr. 20, 2005

(65) Prior Publication Data
US 2006/0242100 A1   Oct. 26, 2006

(51) Int. Cl.
*G06F 13/00* (2006.01)

(52) U.S. Cl. .................. 711/144; 711/156; 707/203; 717/118

(58) Field of Classification Search ............ 711/144, 711/156; 707/103, 203; 715/509, 511; 717/118
See application file for complete search history.

(56) References Cited

U.S. PATENT DOCUMENTS

| | | | |
|---|---|---|---|
| 5,926,807 A | 7/1999 | Peltonen et al. | |
| 6,460,043 B1 * | 10/2002 | Tabbara et al. | ............. 707/100 |
| 6,484,179 B1 | 11/2002 | Roccaforte | |
| 6,587,856 B1 | 7/2003 | Srinivasan et al. | |
| 6,907,422 B1 | 6/2005 | Predovic | |
| 7,089,566 B1 * | 8/2006 | Johnson | ................ 719/328 |
| 2002/0143728 A1 * | 10/2002 | Cotner et al. | .................. 707/1 |
| 2002/0143751 A1 * | 10/2002 | Chow et al. | .................... 707/3 |
| 2003/0163598 A1 * | 8/2003 | Wilson et al. | ............... 709/318 |
| 2003/0208503 A1 | 11/2003 | Roccaforte | |
| 2004/0032432 A1 | 2/2004 | Baynger | |
| 2004/0250241 A1 * | 12/2004 | O'Neil et al. | ............... 717/118 |
| 2005/0055336 A1 * | 3/2005 | Hui et al. | ....................... 707/3 |
| 2005/0055382 A1 | 3/2005 | Ferrat et al. | |
| 2005/0114621 A1 * | 5/2005 | Lahiri et al. | ................ 711/170 |
| 2005/0256835 A1 | 11/2005 | Jenkins et al. | |

OTHER PUBLICATIONS

RowSet (Java 2 Platform SE v1.4.2) http://java.sun.com/j2se/1.4.2/docs/api/javax/sql/RowSet.html, pp. 1-18, Dec. 15, 2004.
ResultSet (Java 2 Platform SE v1.4.2) http://java.sun.com/j2se/1.4.2/docs/api/javax/sql/ResultSet.html, pp. 1-69, Dec. 15, 2004.
Fisher et al., "JDBC™ RowSet Implementations Tutorial" Sun Microsystems Inc., Revision 1.0, pp. 1-94, Feb. 12, 2005.

* cited by examiner

*Primary Examiner*—Reba I Elmore
(74) *Attorney, Agent, or Firm*—Fliesler Meyer LLP

(57) ABSTRACT

Multiple Shared Rowsets, can access rows of data stored in a Cached Rowset independently. These Shared Rowsets can have their own cursor, sorted order, filtered rows, and pending changes.

18 Claims, 8 Drawing Sheets

SHARED ROWSET

BACKGROUND OF INVENTION

Java Database Connectivity (JDBC) defines a number of types to store data from a database. One of the types is a ResultSet that stores data obtained from a database. The result set can be populated with the results of a query to the database. Another type is a Rowset to store data from a database. A Rowset is a Java bean which stores data obtained from the database. The Rowset uses a cursor which indicates the current row of the data in a Rowset for operations. The Rowset can be a connected Rowset with an active connection to the database, or a cached Rowset without an active connection to the database. A row can be modified or created using the cached Rowset and then written back to the database at a later time. Java Specification Request (JSR) 114 describes a basic Rowset implementation.

DETAILED DESCRIPTION

Shared Rowset

Figure 1:
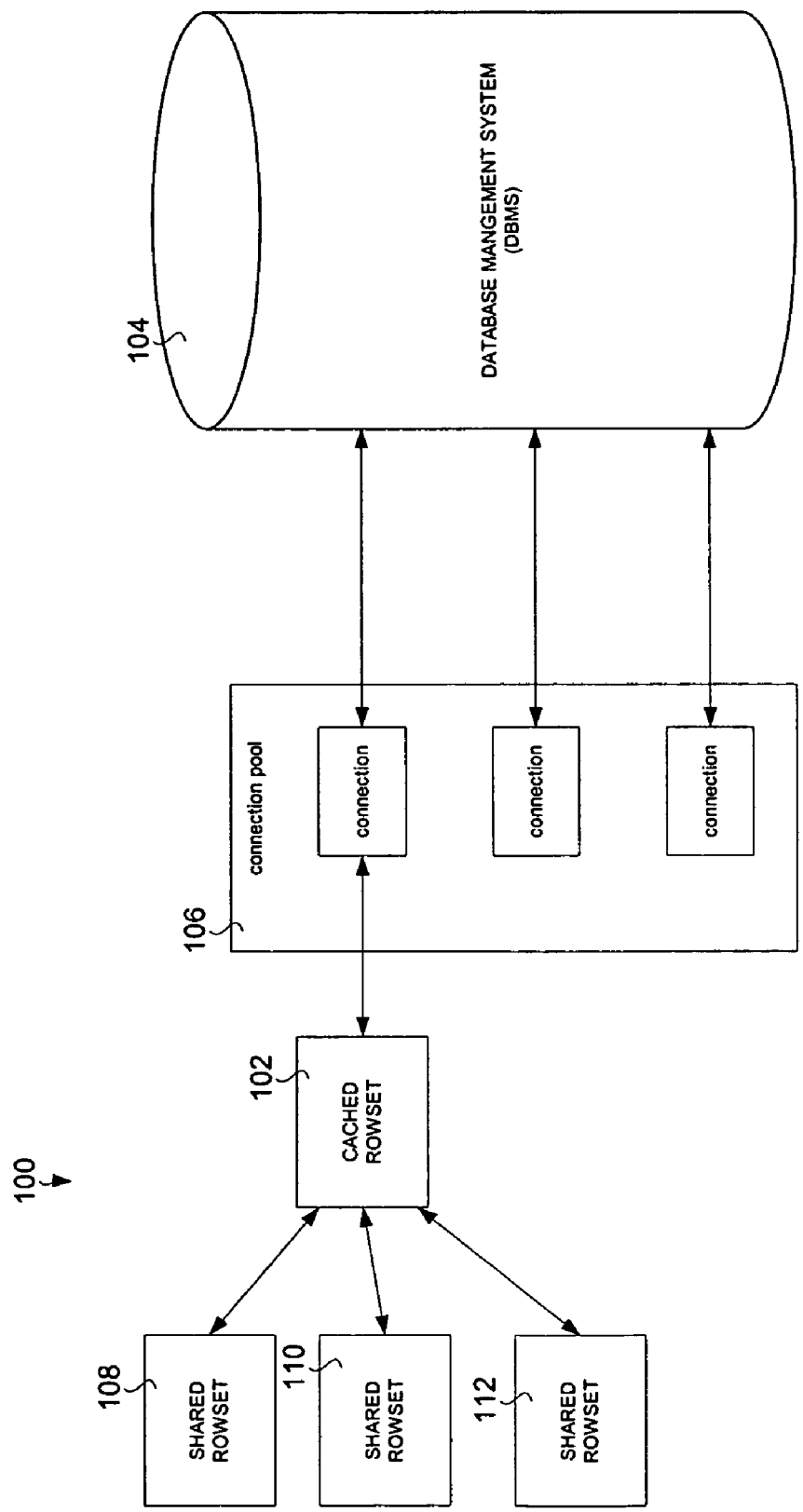
FIG. 1 illustrates an embodiment using Shared Rowsets which allows the stored data of a Cached Rowset to be used for multiple threads or users.

FIG. 1 illustrates a system 100 including a rowset 102. The Rowset 102 can be populated with rows of data from the database 104. In one embodiment, the Rowset 102 is populated through or a part of the connection pool 106. Multiple objects 108, 110 and 112 interact with the data in the rowset 102. The objects 108, 110 and 112 allow independent accessing of data stored in the Rowset 102 in more than one thread. In one embodiment, the objects 108, 110 and 112 are Shared Rowsets and the Rowset 102 is a Cached Roswet.

Figure 2:
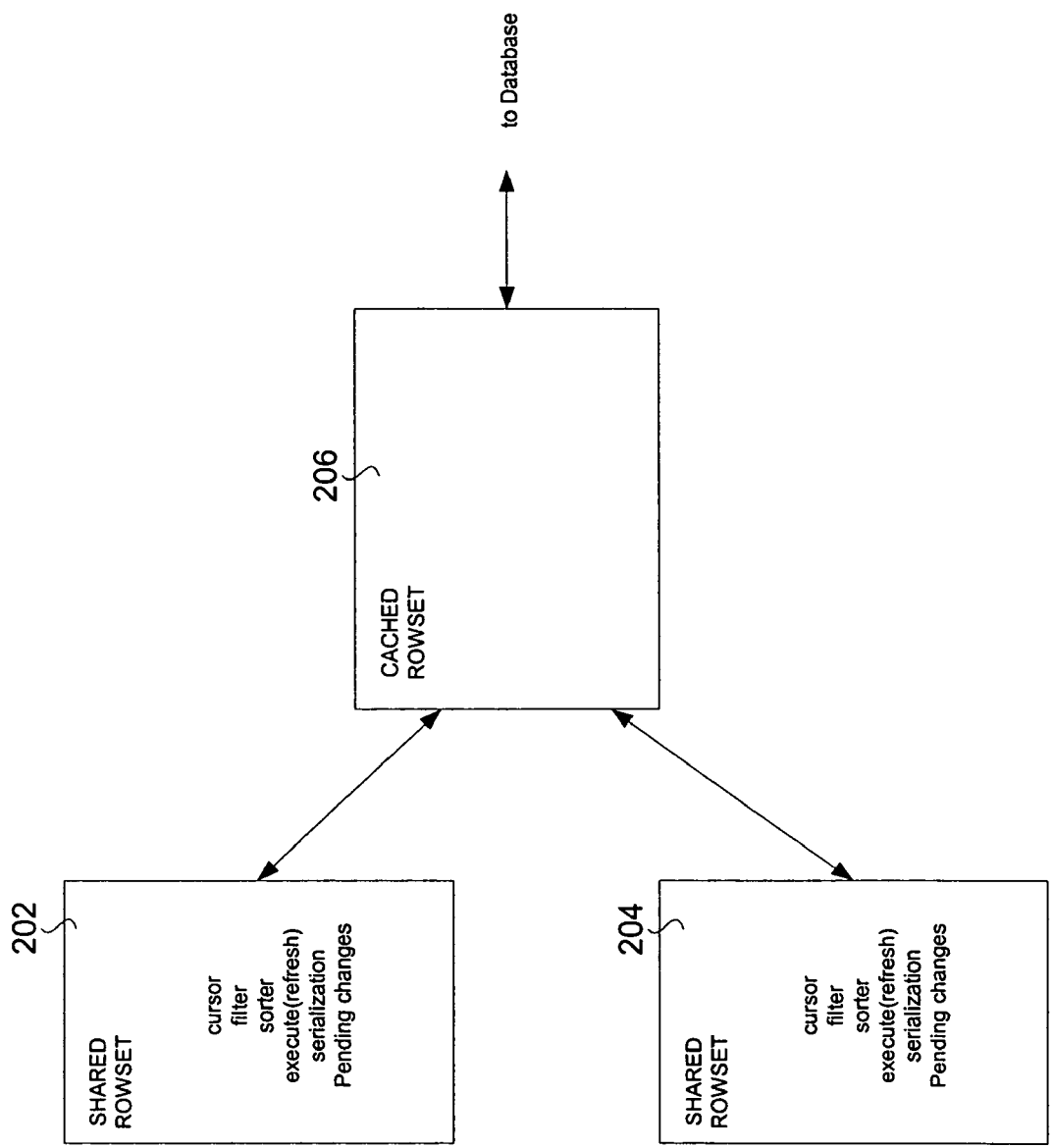
FIG. 2 illustrates an example of a Shared Rowset of one embodiment of the present invention.

FIG. 2 illustrates an example in which Shared Rowsets 202 and 204 interact with data in the Cached Rowset 206. The Shared Rowsets 202 and 204 can use a lightweight data structure implementation that need not copy the data of the Cached Rowset 206. For example, Cached Rowset 206 can be populated with the data of a catalog, and the lightweight Shared Rowsets can allow multiple users to access the catalog data at the same time without requiring Cached Rowsets for each user.

In one embodiment, Shared Rowsets 202 and 204 have independent cursors. The cursors can point to different rows of the data in the rowset 206. This helps allow the different threads and users of the different Shared Rowsets to have independent operations, such as displays that operate on different rows.

The Shared Rowsets also can have independent filters. Filters can be used to hide rows of data in the Cached Rowset from displays or other operations which access rows of data with the Shared Rowset. A specific SQL-type filter for use with a Shared or Cached Rowset is described below. In one embodiment, a bit can be set for each row indicating whether the row has been filtered out. Different operations can use the filter bits to determine whether to access specific rows for an operation. For example, after a filter is done and a user requests the next ten rows of data, the next ten unfiltered rows after the cursor can be provided.

In one embodiment, the objects (such as the Shared Rowsets) can include independent sorters. As described below, sorters can rearrange the rows for the different operations. The ability to have a sorter at the Rowset 206 or Shared Rowset 202 has the advantage that resorted data need not be obtained from the database. The sorting can be implemented using pointers. Details of one embodiment are described below with respect to FIG. 4.

Looking again at FIG. 2, in one embodiment, an execute (refresh) function obtains the latest version of the data stored in the Cached Rowset 206. Rows of data can be updated at the Cached Rowset 206 and later stored into the database. An update to a Row can first be stored as pending changes at the Shared Rowset, written as an update to the Cached Rowset 206 and then finally written into the database.

In one embodiment, the Shared Rowset can have a serialization function which can convert the Shared Rowset into a Cached Rowset which then can then be transmitted using the serialization function of a Cached Rowset.

In one embodiment, the objects 202 and 204 can store local versions of the modified data. The modified data from the object can be later synced back into the Cached Rowset 206. The objects 202 and 204 need not store all of the rowset data. The objects 202 and 204 can merely point to rows of the data stored in the Cached Rowset 206 as well as any local version of modified data stored at the objects 202 and 204.

An object 202 can interact with data in a rowset such as Cached Rowset 206. The objects 202 and 204 can allow independent accessing of data from the Rowset 206. The object can have a context including a cursor and a filter that operate independently from any other object. Such an object 204 can access the data in the Rowset.

Figure 3A:
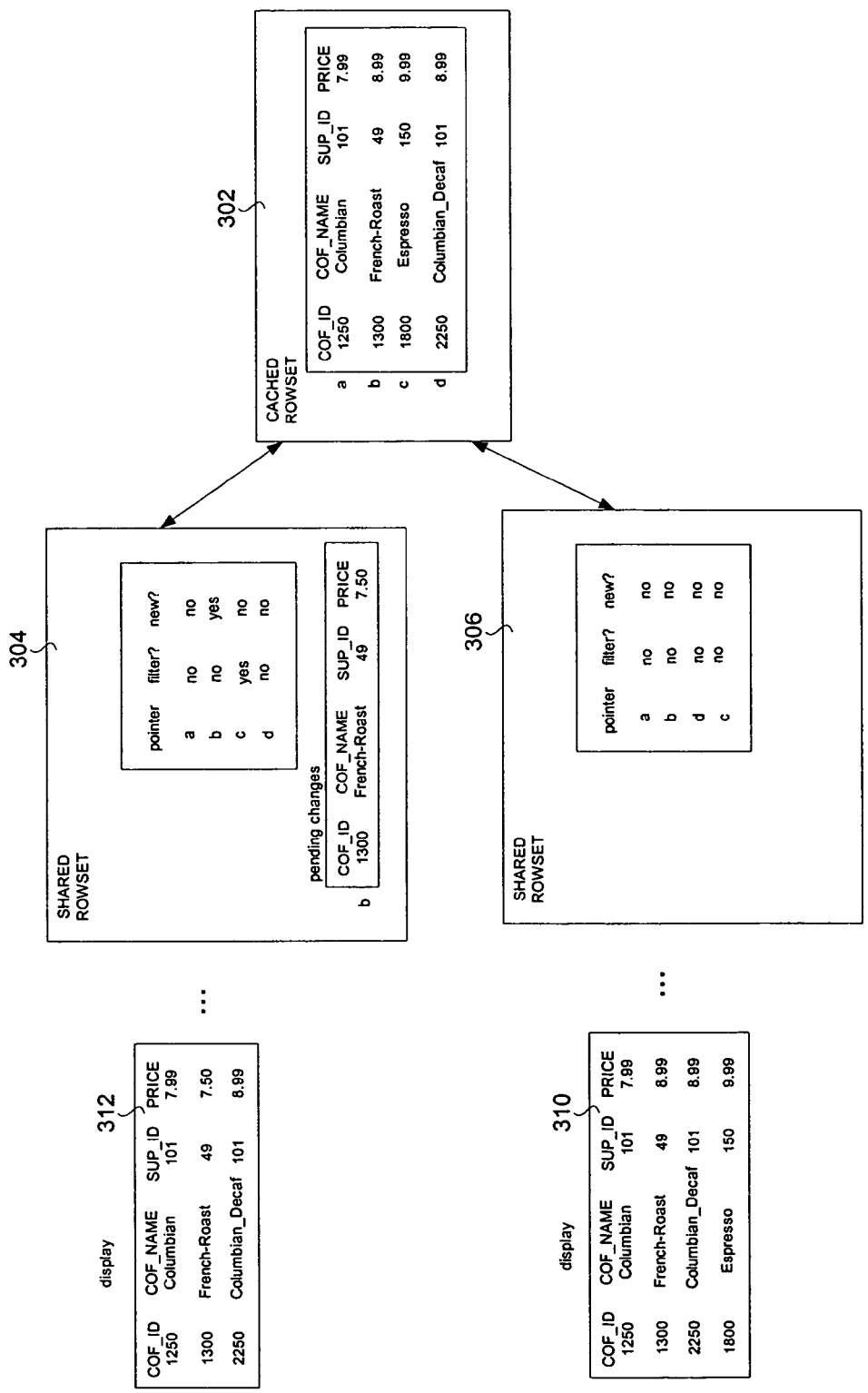
FIGS. 3A-3C illustrates details of one embodiment of a Shared Rowset.

FIG. 3A illustrates an embodiment using Shared Rowsets. A Cached Rowset 302 can store rows of data obtained from a database. In this example, the Cached Rowset stores rows of data concerning coffee. The Shared Rowsets 304 and 306 can independently access the data in the Cached Rowset 302. In one embodiment, a sorter is implemented using pointers. FIG. 3A illustrates an example in which the Shared Rowset 306 sorts the data in the Cached Rowset 302 according to price. In this embodiment, the sorting is done independently from any other Shared Rowset such as Shared Rowset 304, which independently access operation, the data in the Cached Rowset 302. The pointers at the Shared Rowsets 306 allow any later function such as a display 310 using the Shared Rowset 306 can have the data sorted as desired, such as the sort according to price.

Shared Rowset 304 has row c filtered out. The display 312 which uses the Shared Rowset 304 does not include the filtered row c. The row c could be filtered out if the user doesn't want to show any row with coffee costing more than $9.00, for example.

Figure 3B:
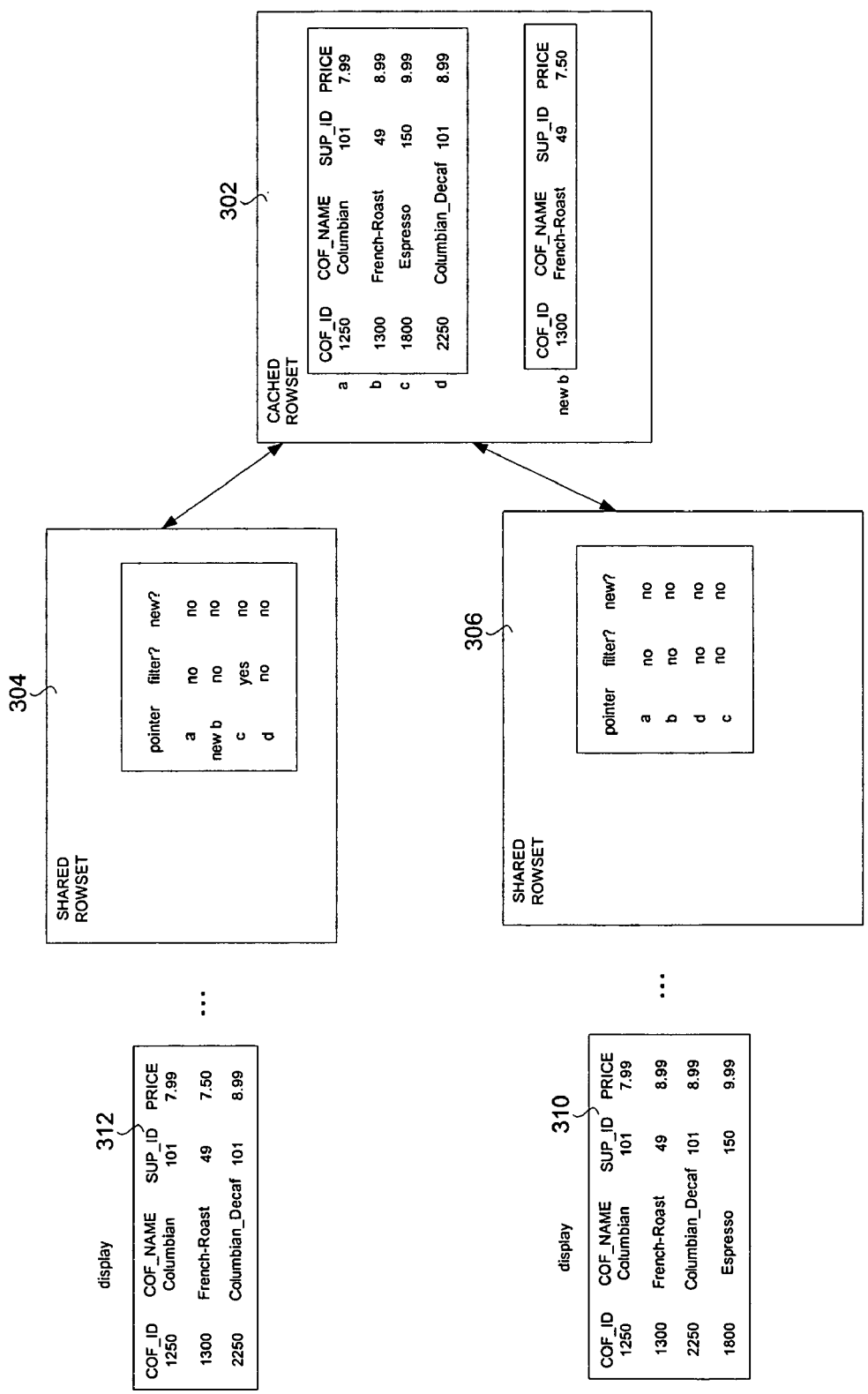

Pending changes for the row b can be stored at the Shared Rowset 304. In the example of FIG. 3B, the pending changes for row b can be written back to the Cached Rowset 302. In this example, the Cached Rowset 302 stores both the new row b as well as the old row b. The old row b should be maintained, since the Shared Rowset 306 still has a link to this row at the Cached Rowset 302. When both Shared Rowset 304 and 306 remove the pointer to the old row b at the Cached Rowset 302, the old row b can be garbage collected. The new row b can be written back to the database by the Cached Rowset 302 using the protocol as described in JSR 114.

Figure 3C:
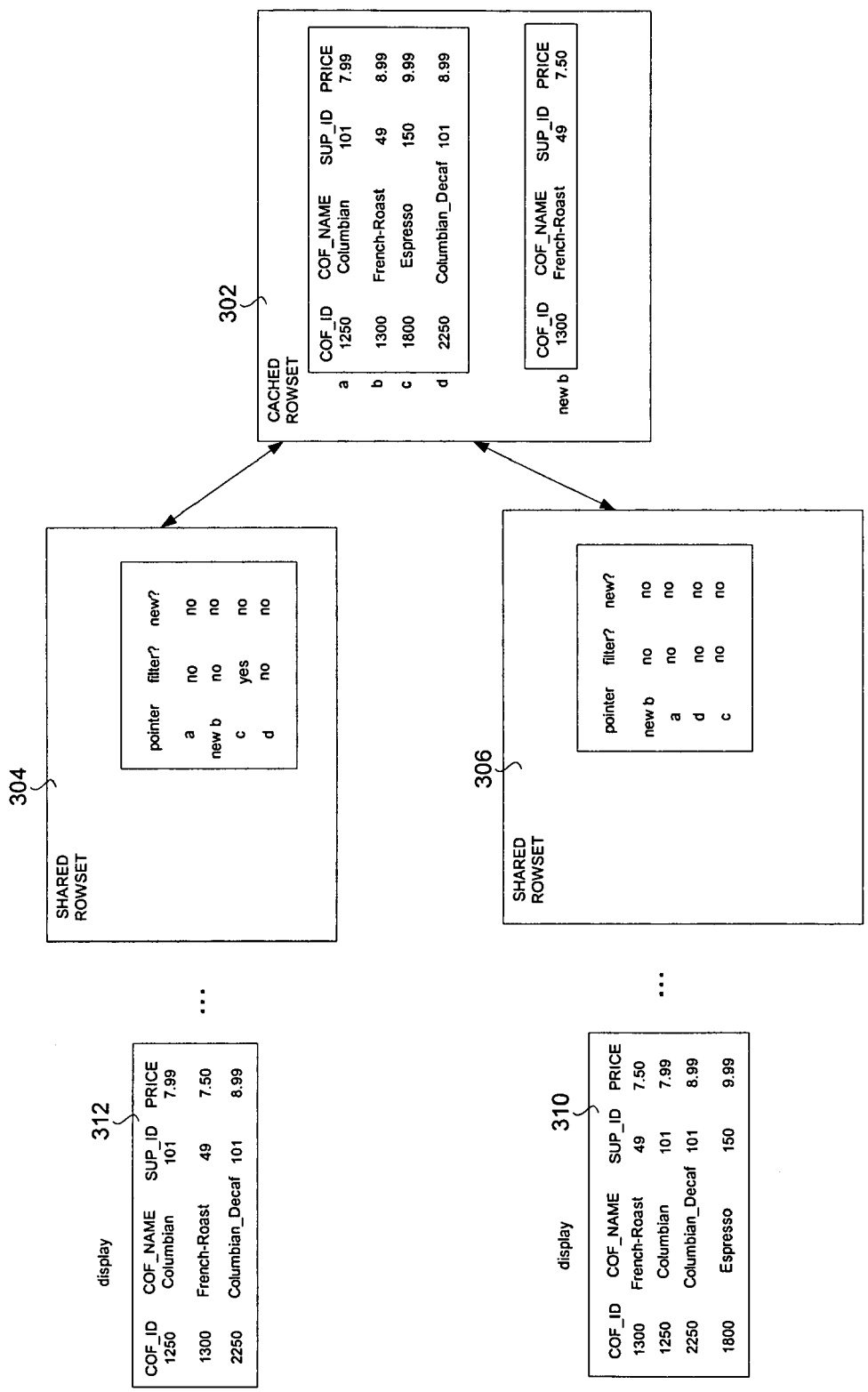

FIG. 3C illustrates an example in which the Shared Rowset 306 refreshes. When the Shared Rowset 306 refreshes, Shared Rowset 306 will point to the new row b rather than the old row b and for this reason the old row b can now be garbage collected since no Shared Rowset points to the row b in the Cached Rowset 302. Since the new row b has a different price, the rows of data may need to be resorted after a refresh. This not need to be a full sort, but only be a partial sort which puts the new rows of data into the pointer table according to the sort criteria.

Figure 6:
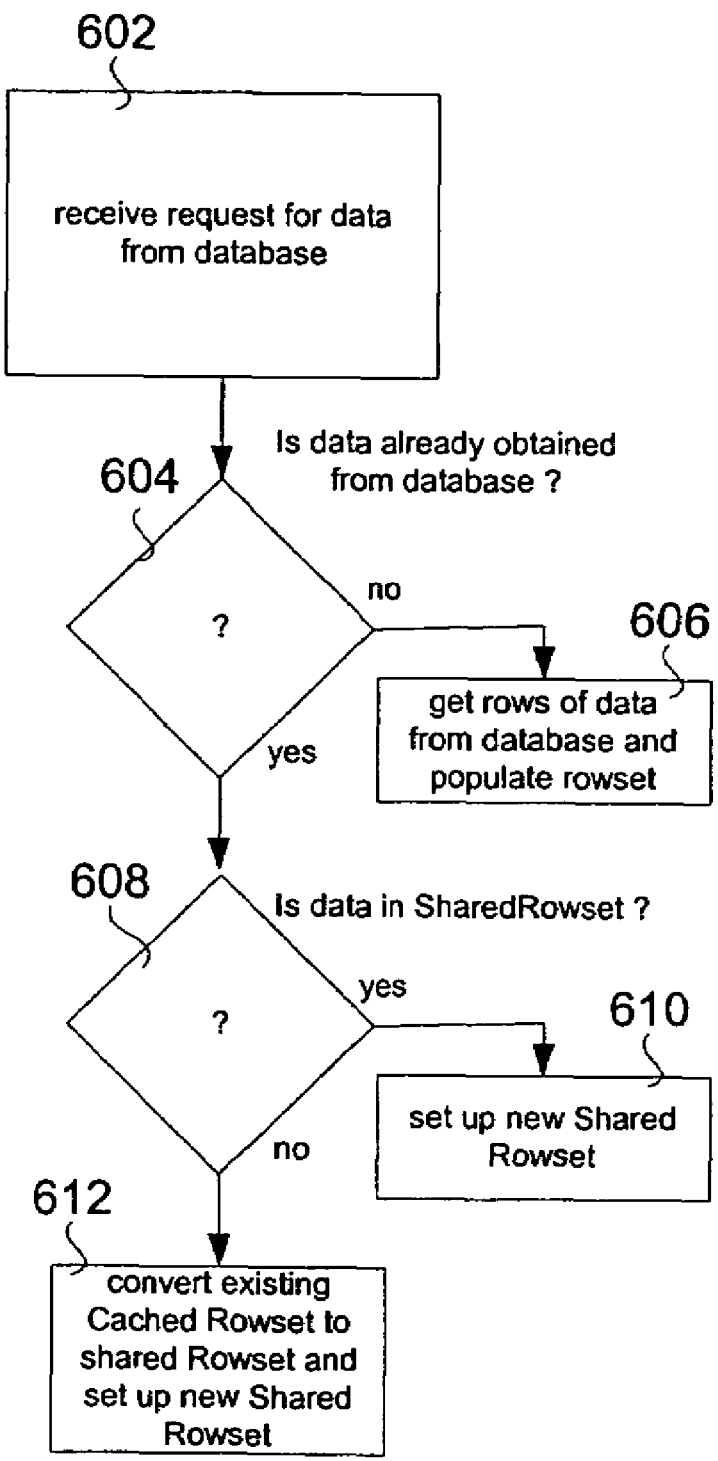
FIG. 6 is a flowchart illustrating the operation of a Shared Rowset of one embodiment of the present invention.

FIG. 6, illustrates one embodiment of the use of a shared Rowset for use by a Cache management system. In step 602, requested data from the database is received. It is determined whether the data is already obtained from the database, in step 604. If not, rows of data can be obtained from the database and used to populate a Cached Rowset, in step 606. In one embodiment, if it is anticipated that multiple application will want independently access to the Cached Rowset, first a Shared Rowset can be created at the time. If the data is already obtained from the database, in step 610 is determined whether the data is already in a Shared Rowset. If not, in step 612, a existing Cached Rowset can be converted to a Shared Rowset and an additional new Shared Rowset can be set up.

The system can use a cache management system in a number of embodiments. For example, in one embodiment, a cache manager might decide not to remove a data from a rowset once the application not longer needs the data. The system may anticipate that a later application may come along that will need the data and thus keep rows of data in a Cached Rowset so that a Shared Rowset Pointing to a particular rows of data can be quickly set up as needed.

Sorted Rowset

Figure 4:
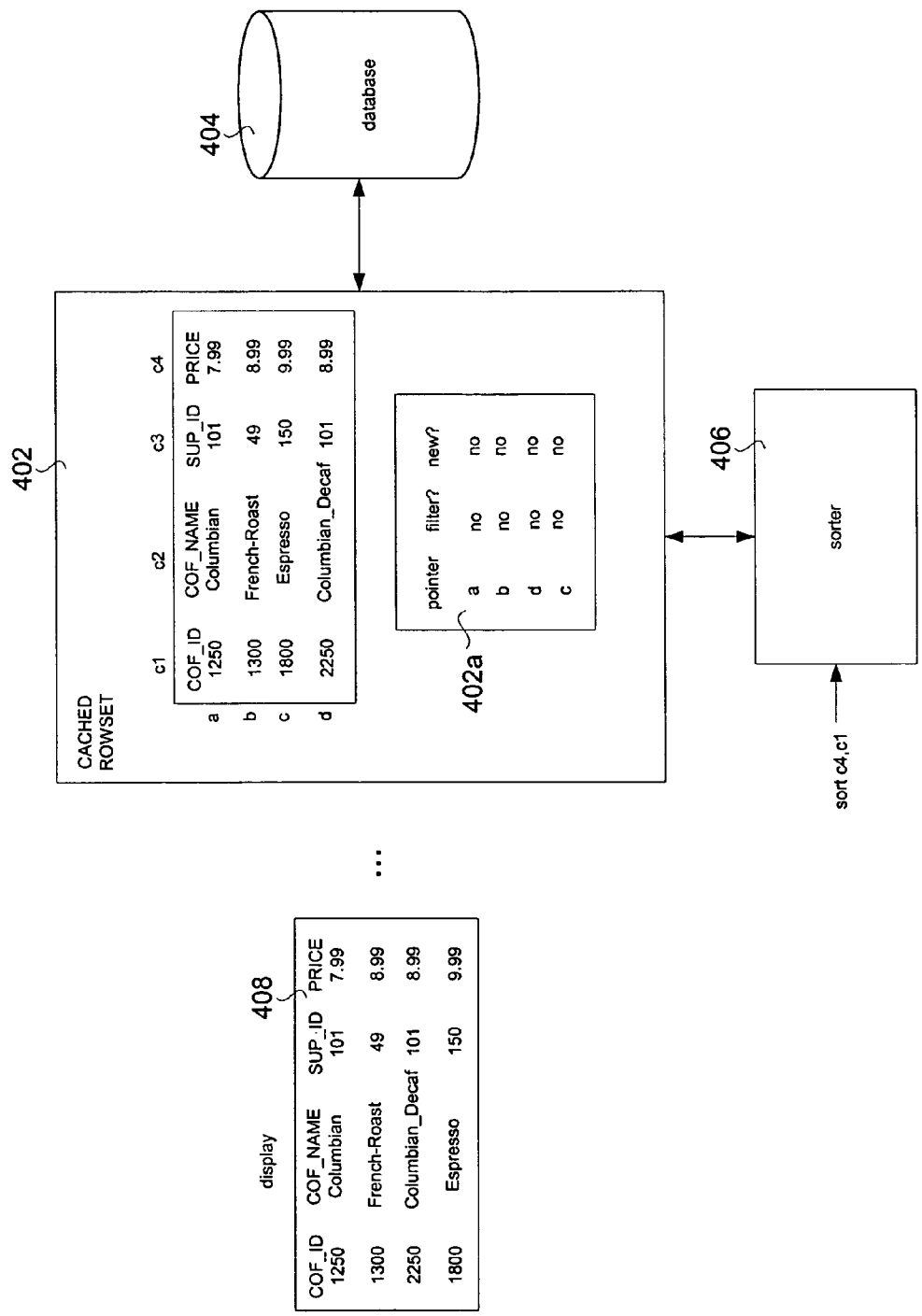
FIG. 4 illustrates the operation of a sorter of one embodiment of the present invention.

FIG. 4 illustrates an example in which a rowset 402 be populated with rows of data from the database 404. An associated sorter 406 is adapted to sort the rows of data in the rowset without accessing the database 404. The accessing of the rowset uses the new sorted order.

The operations can include cursor-based operations such as display 408. The sorting can create a table of sorted pointers to rows in the Cached Rowset. The sorter can be associated with the rowset using a Shared Rowset object. Operations accessing the rowset data through the Shared Rowset object can use a new sorted order as shown in FIGS. 3A-3C. The operations accessing the rowset data from another Shared Rowset object need not use the new sorted order. The rowset 304 can be a Cached Rowset. In the example of FIG. 4, the sorter 406 sorts the rows of the data stored in the Cached Rowset 402 and populates a table 402a including pointers to create the sorted order. The display 404 using rowset 402 can be a display which is sorted according to price.

One implementation of the sorter 406 receives indications of the columns to sort by. In the example shown in FIG. 4, the table is sorted by column 4 (c4) "Price" and then column 2 (c2) "Cof-ID". This sort is used to determine how to set the pointers in table 402a. The rowset 402 can have a sorter interface for interacting with the sorter 406.

The sorter 406 associated with the rowset 402 can be adapted to sort the rows in the rowset without accessing the database 404. Operations accessing the data of the rowset can use the new sorted order.

SQL-Style Filtered Rowset

Figure 5:
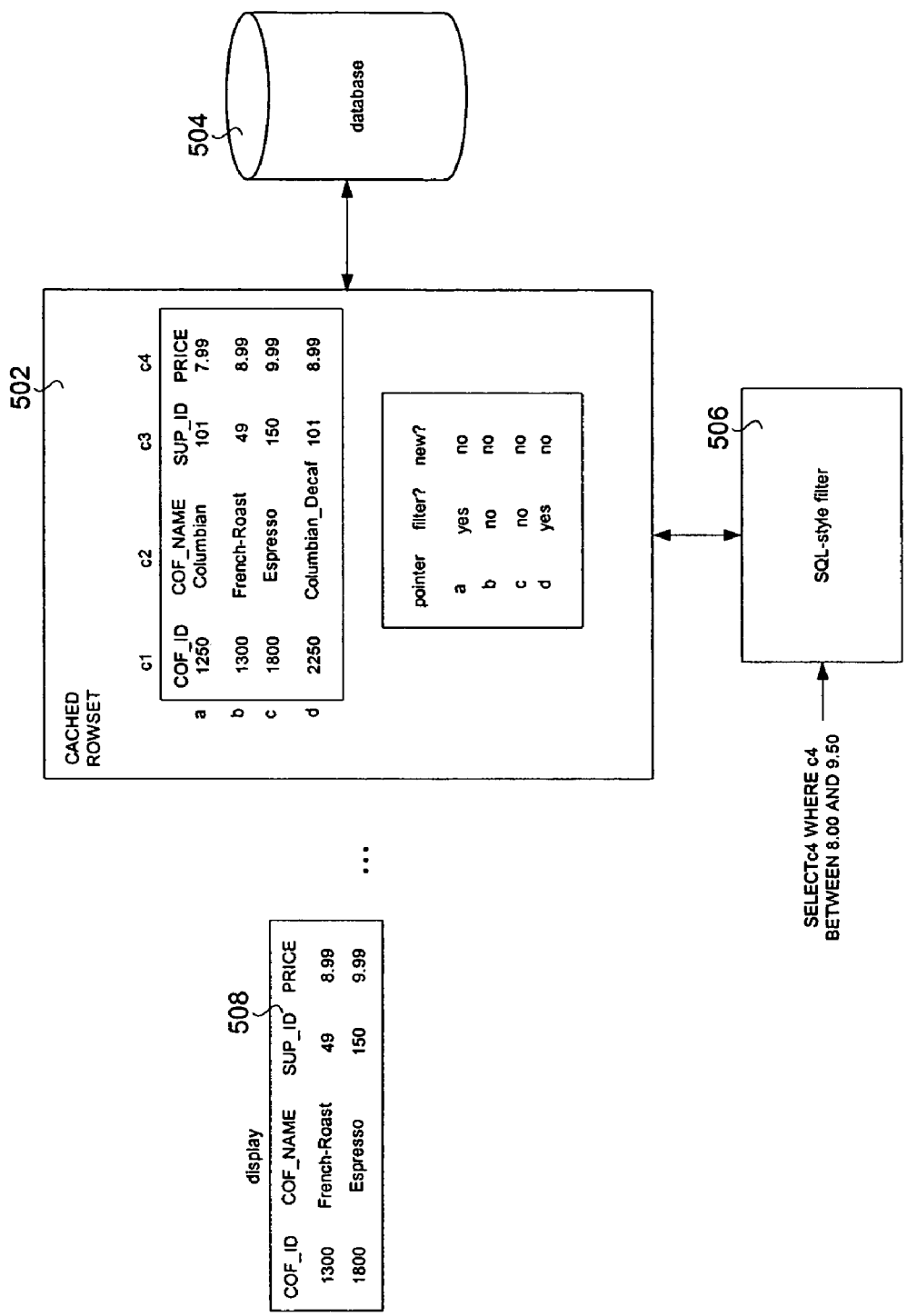
FIG. 5 illustrates one embodiment of a SQL-style filter for a rowset of one embodiment of the present invention.

FIG. 5 illustrates an example with a rowset 502 which can be populated with rows of data from the database 504. An associated filter 506 is adapted to receive a query string and filter the rows of data in the rowset based upon the query string. The filter can be such that the operations accessing the rowset do not use the rows that are filtered out.

The use of a filter using a query string simplifies the operation for the application. The application can use well known query languages such as a SQL. The filter can parse the query to determine the rows to filter out.

In the example of FIG. 5, the filter 406 receives a query sting which indicates selection of a filtering by c4 "Price", where the price is in between 8.00 and 9.50. In this example, it filters out rows a and b. The display 508 which uses the filtered Rowset 502 will only show rows b and c.

Later operations, which can include cursor-based operations such as displays, will not show the rows that are filtered out. A filter can be associated with the Rowset using a Shared Rowset object like that as shown in FIGS. 3A-3C. Operations accessing the rowset data with another shared filter will not be affected by the filter operation wont be filtered out. In one embodiment, a SQL-Style filter 506 can be associated with a Shared Rowset. The rowset 502 can be Cached Rowset. The query sharing can be an SQL query. A sorter can also be associated with a rowset.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a storage medium (media) having instructions stored thereon/in which can be used to program a computer to perform any of the features presented herein. The storage medium can include, but is not limited to, any type of disk including floppy disks, optical discs, DVD, CD-ROMs, micro drive, and magneto-optical disks, ROMs, Rams, EPROM's, EPROM's, Drams, Rams, flash memory devices, magnetic or optical cards, Nan systems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and user applications.

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts. For example, steps performed in the embodiments of the invention disclosed can be performed in alternate orders, certain steps can be omitted, and additional steps can be added. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalents.

What is claimed is:

1. A computer-based system including:
   a rowset populated with rows of data from a database; and
   multiple objects interacting with the data in the rowset, the multiple objects allowing the independent accessing of data from the rowset using multiple independent cursors pointing to different rows in the rowset, the multiple objects having independent filters to filter the data in the rowset in different ways;
   wherein the object is a lightweight object that does not contain row data from the rowset or the database, the object and other objects accessing row data through the rowset without causing additional database access; and
   wherein the system implements the multiple objects using at least one processor and at least one memory.

2. The computer-based system of claim 1, wherein the rowset is a Cached rowset.

3. The computer-based system of claim 1, wherein the objects are Shared Rowsets.

4. The computer-based system of claim 1, wherein the objects include independent sorters.

5. The computer-based system of claim 1, wherein the object maintains a local version of modified data.

6. The computer-based system of claim 5, wherein modified data from the object can be synced back to the rowset.

7. The computer-based system of claim 1, wherein object can point to new or old versions of rows in rowset.

8. The computer-based system of claim 7, wherein the object can refresh to point to new version of each row.

9. A computer-based system including object adapted to interact with data in a rowset, the object allowing the independent accessing of data from the rowset, the object having a context including an independent cursor and an independent filter that both operate independently from any other object having a separate independent context including a cursor and filter accessing the data in the rowset;
   wherein the object is a lightweight object that does not contain row data from the rowset or the database, the object and other objects accessing row data through the rowset without causing additional database access; and
   wherein the system implements the object using at least one processor and at least one memory.

10. The computer-based system of claim 9, wherein the rowset is a Cached rowset.

11. The computer-based system of claim 9, wherein the objects is a Shared Rowsets.

12. The computer-based system of claim 9, wherein the context includes an independent sorter.

13. The computer-based system of claim 9, wherein modified data from the object can be synced back to the rowset.

14. A computer-based system including a rowset that allows multiple threads to access data in a rowset, the implementation including objects having independent contexts including independent cursors and independent filters that both operate independently from any other object accessing the data in the rowset;
   wherein the object is a lightweight object that does not contain row data from the rowset or the database, the object and other objects accessing row data through the rowset without causing additional database access; and
   wherein the system implements the multiple objects using at least one processor and at least one memory.

15. The computer-based system of claim 14, wherein the rowset is a Cached rowset.

16. The computer-based system of claim 14, wherein the objects is a Shared Rowsets.

17. The computer-based system of claim 14, wherein the context includes an independent sorter.

18. The computer-based system of claim 14, wherein modified data from the object can be synced back to the rowset.

* * * * *